United States Patent
Kerai et al.

(10) Patent No.: US 9,288,759 B2
(45) Date of Patent: Mar. 15, 2016

(54) METHOD AND APPARATUS FOR REDUCED POWER CONSUMPTION WHEN OPERATING AS A BLUETOOTH LOW ENERGY DEVICE

(75) Inventors: Kanji Kerai, London (GB); James Dent, Surrey (GB)

(73) Assignee: Nokia Technologies Oy, Espoo (FI)

(*) Notice: Subject to any disclaimer, the term of this patent is extended or adjusted under 35 U.S.C. 154(b) by 162 days.

(21) Appl. No.: 13/386,655

(22) PCT Filed: Jul. 23, 2009

(86) PCT No.: PCT/IB2009/006351
§ 371 (c)(1),
(2), (4) Date: May 9, 2012

(87) PCT Pub. No.: WO2011/010181
PCT Pub. Date: Jan. 27, 2011

(65) Prior Publication Data
US 2012/0220351 A1   Aug. 30, 2012

(51) Int. Cl.
*H04W 52/02* (2009.01)
*H04W 84/20* (2009.01)

(52) U.S. Cl.
CPC .......... *H04W 52/0229* (2013.01); *H04W 84/20* (2013.01); *Y02B 60/50* (2013.01)

(58) Field of Classification Search
CPC ................ H04W 52/0219; H04W 76/048
See application file for complete search history.

(56) References Cited

U.S. PATENT DOCUMENTS

| | | | | |
|---|---|---|---|---|
| 6,223,047 | B1* | 4/2001 | Ericsson | 455/517 |
| 6,574,198 | B1* | 6/2003 | Petersson | 370/252 |
| 6,691,071 | B2* | 2/2004 | Kerr et al. | 702/188 |
| 7,397,812 | B2* | 7/2008 | Nix | H04B 7/18582 370/432 |
| 7,412,517 | B2* | 8/2008 | Jorgensen | H04L 1/20 455/3.03 |
| 7,505,795 | B1 | 3/2009 | Lim et al. | |
| 7,979,098 | B1* | 7/2011 | Elliott | H04W 72/1278 455/343.2 |
| 8,107,968 | B2* | 1/2012 | Kasslin | H04W 88/06 370/329 |
| 8,170,482 | B2* | 5/2012 | Linsky | H04L 7/10 455/39 |
| 2002/0009055 | A1* | 1/2002 | Sugaya | 370/252 |
| 2003/0063619 | A1* | 4/2003 | Montano | H04L 29/12009 370/443 |
| 2007/0060132 | A1* | 3/2007 | Wilhelmsson | H04W 52/325 455/445 |
| 2007/0183383 | A1* | 8/2007 | Bitran | H04W 88/06 370/338 |

(Continued)

FOREIGN PATENT DOCUMENTS

| | | | |
|---|---|---|---|
| EP | 0627836 | A2 | 12/1994 |
| EP | 1202495 | A2 | 5/2002 |

(Continued)

OTHER PUBLICATIONS

Extended European Search Report for Application No. 09847520.5-1852 / 2457332 dated Dec. 12, 2014.
International Search Report and Written Opinion received for corresponding International Patent Application No. PCT/IB2009/006351, dated May 6, 2010, 13 pages.
Office Action received for corresponding Japanese Patent Application No. 2012-521106, dated Feb. 27, 2013, 3 pages of Office Action and 5 pages of Office Action translation.
"Specification of the Bluetooth System", Bluetooth Specification, v4.0, Jun. 30, 2010, 2301 pages.

*Primary Examiner* — Khalid Shaheed
*Assistant Examiner* — Frank Donado
(74) *Attorney, Agent, or Firm* — Locke Lord LLP (57) ABSTRACT

An apparatus, a method and a computer program product is disclosed for a Bluetooth communication transceiver. The Bluetooth communication transceiver is configured as a Bluetooth low energy device performing timing measurements which are to be used for power saving. Based at least in part on the timing measurements, receive activation timings of the Bluetooth communication transceiver are adjusted. Further, a sleep clock of the apparatus may be used for calibration of the receive activation timings.

14 Claims, 6 Drawing Sheets

(56) References Cited

U.S. PATENT DOCUMENTS

| | | | |
|---|---|---|---|
| 2007/0217378 A1* | 9/2007 | Moorti et al. | 370/338 |
| 2007/0258395 A1* | 11/2007 | Jollota | A61B 5/14532 370/310 |
| 2008/0254841 A1* | 10/2008 | Miyata | H04B 1/406 455/574 |
| 2009/0163216 A1* | 6/2009 | Hoang et al. | 455/450 |
| 2009/0181661 A1* | 7/2009 | Kitazoe et al. | 455/418 |
| 2010/0093279 A1* | 4/2010 | Linsky | H03L 7/183 455/41.2 |
| 2010/0105409 A1* | 4/2010 | Agarwal | G01S 5/0263 455/456.1 |
| 2010/0130122 A1* | 5/2010 | Sridhar | H04H 60/66 455/3.01 |

FOREIGN PATENT DOCUMENTS

| | | |
|---|---|---|
| EP | 1223680 A2 | 7/2002 |
| EP | 1 560 383 A2 | 8/2005 |
| JP | 2007-243514 A | 9/2007 |
| JP | 2007-288639 A | 11/2007 |
| WO | 02/25826 A2 | 3/2002 |
| WO | WO2007078118 A1 | 7/2007 |
| WO | WO2008010700 A1 | 1/2008 |

\* cited by examiner

METHOD AND APPARATUS FOR REDUCED POWER CONSUMPTION WHEN OPERATING AS A BLUETOOTH LOW ENERGY DEVICE

RELATED APPLICATION

This application was originally filed as Patent Cooperation Treaty Application No. PCT/IB2009/006351 filed Jul. 23, 2009.

TECHNICAL FIELD

The present application relates generally to the fields of Bluetooth communications and more specifically to Bluetooth Low Energy devices (BLE).

BACKGROUND

The BLE specification (version 0.9) can be found from the Bluetooth Special Interest Group (BT SIG) at http://www.bluetooth.com/Bluetooth/SIG/.

The Bluetooth Low Energy (BLE) technology is aimed at devices requiring a low power consumption, for example devices that may operate with one or more button cell batteries such as sensors, key fobs, and/or the like. For the technology to take a place in the markets it is expected that such batteries should last for greater than one year, for example when a device operates in slave mode as defined in the BLE specification.

This BLE specification has some states and roles for devices as follows:
  Advertising State
    Discoverable/Connectable/Broadcasting
  Scanning State
    Active or Passive Scanning
  Initiating State
    Initiates a Connection to an Advertiser
  Connected State
    Initiator becomes Master Role
    Advertiser becomes Slave Role For simplicity lets consider an example of a sensing device which can send data at a requested interval or without a dedicated request, for example in an advertising mode. The link between the master/collecting device and slave sensor providing the data may operate with a low duty cycle in order to extend the lifetime of such batteries. A low duty cycle may mean in this context collecting as but only one example data such as a temperature only once every second or even every many seconds.

Figure 1:
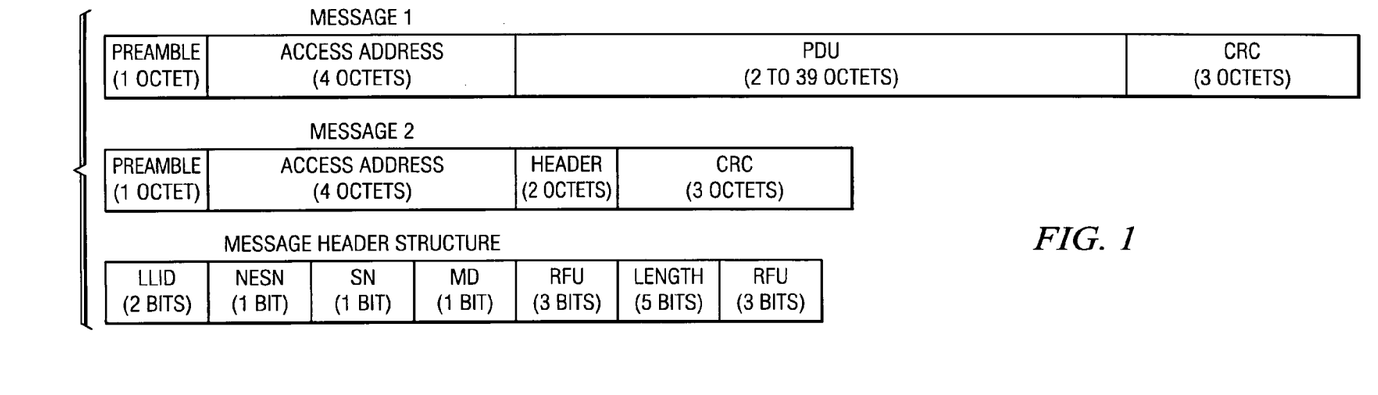
FIG. 1 shows some BLE example message constructs.

An example BLE sensor device may be configured to wake up and communicate with a master/collecting device. In an example embodiment, a BLE sensor is configured to connect with the master/collecting device for a certain time period to indicate or convey some information, and sleep for the rest of the interval. When a slave or a master device is communicating, it takes a significant amount of power from the battery. When the slave or master device is sleeping, a smaller amount of power is consumed. The sleep interval may be timed using a sleep clock. Data may be sent in packets by the slave device and the master device. The current Bluetooth Low Energy specification Version 0.9 defines a packet structure as shown in FIG. 1. The packet structure is described in more detail below.

In an example embodiment, the packet comprises a preamble followed by an access address. The preamble is a fixed pattern of '01010101' or '10101010' depending on the first bit of the access address. If the first bit of the Access Address is '1', the preamble is '10101010'; otherwise the preamble is '01010101'. Possible examples of message constructs can be seen in FIG. 1.

FIG. 1 shows an example message 1 of a master communicating with a slave device on a data channel. The master device may start the communication. The slave device receives the packet and may respond within a short time, for example 150 µs, after the end of the packet from the master. In order to receive the packet from the master, the slave device turns on the receiver. Due to timing inaccuracies at the transmitter and/or the receiver, the slave device may have to turn on the receiver at a time before the nominal receive time for the packet from the master. The time that the slave device turns on the receiver may be called receive window. In an example embodiment, the receive window comprises an additional wake up early duration added to the time for receiving the packet due to sleep clock inaccuracy.

Several options exist for the message structure content. For example referring once more to FIG. 1, the PDU field in the packet structure may consist of a 16-bit header and some (user) data. In another example of an empty data packet, the PDU field only consists of the 16-bit header as shown in Message 2 of FIG. 1. In a further example, such as a proximity use case, empty packets, for example as shown in Message 2 of FIG. 1, may be used to maintain the communication link, as shown in FIG. 1. The communicating devices send and receive 80 bits of the empty packet.

The 16-bit header may comprise:
  Payload data Unit (PDU)
  Cyclic redundancy Check (CRC)
  Logical Link Identifier (LLID)
  Next Expected Sequence (NESN)
  Sequence number (SN)
  More Data (MD)
  Reserved for Future Use (RFU)

SUMMARY

Various aspects of examples of the invention are set out in the claims.

According to a first aspect of the present invention, an apparatus, comprising a Bluetooth communication transceiver is disclosed. The apparatus is configured as a BLE slave device which also comprises a processor configured to perform at least a timing measurement. The timing measurements may be used for power saving and the processor may based on that set of measurements adjust at least an Rx activation timing of said apparatus. In this way, the synchronisation of the slave device's sleep clock may be checked in regular or irregular intervals. This approach may be used in conjunction with several of the later described aspects. In an example embodiment, a BLE slave may be a BLE slave sensor, or an apparatus configured as a slave device of a BLE system or in some example embodiments it may be configured as a master device of a BLE system. The apparatus may be powered by a battery and therefore require a low power consumption. The apparatus may be a mobile apparatus, a sensor apparatus/an apparatus comprising a sensor, and/or the like.

According to a further aspect of the present invention, the apparatus described above may use a timer to measure a connection interval. The apparatus may provide an offset value that is calculated from a measurement of the connection interval and used to reduce at least in part the size of the activation window for at least a subsequent interval.

According to the further aspect of the present invention, the processor of the apparatus described may use the detection of the unique access address for the slave device as a start point for the activation window.

According to yet another aspect of the present invention, the processor of the apparatus described above may detect the Logical Link Identifier (LLID) field in the header and use this to turn off the activation window early.

According to a still further aspect of the present invention, the processor of the apparatus described above may detect that the connection comprises packets of a fixed data length. In an example embodiment, a packet comprises a Cyclic Redundancy Check (CRC) value that is known or predictable for example after the reception of the first packet. Based at least in part on the information from the detection of the approach of the CRC value the activation window is started. If the value of the CRC value itself is as expected, it may be used instead of the preamble for starting the subsequent activation window. As shown in the previous examples, an activation time saving may be made dependant on the device type, function and/or the profile that is active.

According to yet another aspect of the invention, the distance between the apparatus configured as a slave device and a master device may be constant. Therefore, the latency of transmissions between the apparatus and the master device is also constant. When the processor of the apparatus determines that the latency is fixed, it may at least in part reduce the number of times when to respond to requests from the master device.

According to a further aspect of the present invention the apparatus described above may perform a method. The method may comprise utilising the processor for performing at least one timing measurement for power saving on the received master transitions. Then, based on the at least one timing measurement, the method may further comprise performing an adjustment of a receive activation window of the apparatus.

According to a further aspect of the present invention, the previous method in which the connection interval is measured may further determine an offset value based on the at least one timing measurement. The determined offset value may also be used to reduce the size of the activation window for subsequent intervals.

According to yet another aspect of the present invention, the method described above may further comprise detecting an event related to a use of a unique access address when the apparatus is configured as a slave device. The detected event may be used as a start point for an activation window.

According to yet a further aspect of the present invention, the method may further comprise detecting the LLID field in the header. Based on the detected value of the LLID field, the processor may turn off the activation window early.

According to a further aspect of the present invention, a method is disclosed in which the processor may detect that the connection is of a fixed data length. This could be for instance one message structure in which the CRC value is known. So in this example a time just before receiving the CRC value can be used instead of the preamble by the processor for starting the activation window.

The previous aspect described may be activated at a time dependant on a device type, a function, a profile that is active, and/or the like.

According to one more aspect of the present invention, a BLE apparatus is disclosed, comprising a processor configured to sample one or more timings of the master's transitions determine from at least one of an active message type, function and profile which of the described activation time saving method or methods can be made. Based on this the processor may adjust the slave's receive activation window accordingly.

According to yet a further aspect of the present invention, the apparatus described above in the first aspect may comprise a processor, and at least one memory that contains executable instructions that if executed by the processor cause the apparatus to sample the timings of the master's transitions and to decide on what activation time saving can be made, and to adjust the slave's receive activation window accordingly.

According to a further aspect of the present invention a computer program is disclosed, comprising code for sampling the timings of the master's transitions, code for deciding on what activation time saving can be made, and code for adjusting the slave's receive activation window accordingly when that computer program is run on a processor.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

According to another aspect of the invention, a computer-readable medium encoded with instructions is disclosed. The instructions, when executed by a processor, can perform or may enable: sampling the timings of the master's transitions, decide on what activation of time saving can be made, and adjusting the slave's receive activation window accordingly. The computer program instructions may arrive at the apparatus via an electromagnetic carrier signal or be copied from a physical entity such as a computer program product, a memory device or a record medium such as but not exclusively a CD-ROM or DVD, and/or an article of manufacture that tangibly embodies the computer program.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays (FPGA), application specify circuits (ASIC), signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, and/or the like.

The options to select from the various time savings may depend on the type of connection with the other BT device. It may further depend on a current profile of the device which would define a type and frequency of one or more expected messages.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

FIG. 1 shows some BLE example message constructs. The example message constructs are described in more detail in the background part of this specification.

Whilst endeavouring in the forgoing specification to draw attention to those features of the invention believed to be of particular importance it should be understood that the applicant claims protection in respect of any patentable feature or combination of features hereinbefore referred to and/or shown in the drawings whether or not particular emphasis has been placed on them.

Example embodiments of the present invention and its potential advantages are understood by referring to FIGS. 2 through 15 of the drawings.

Figure 2:
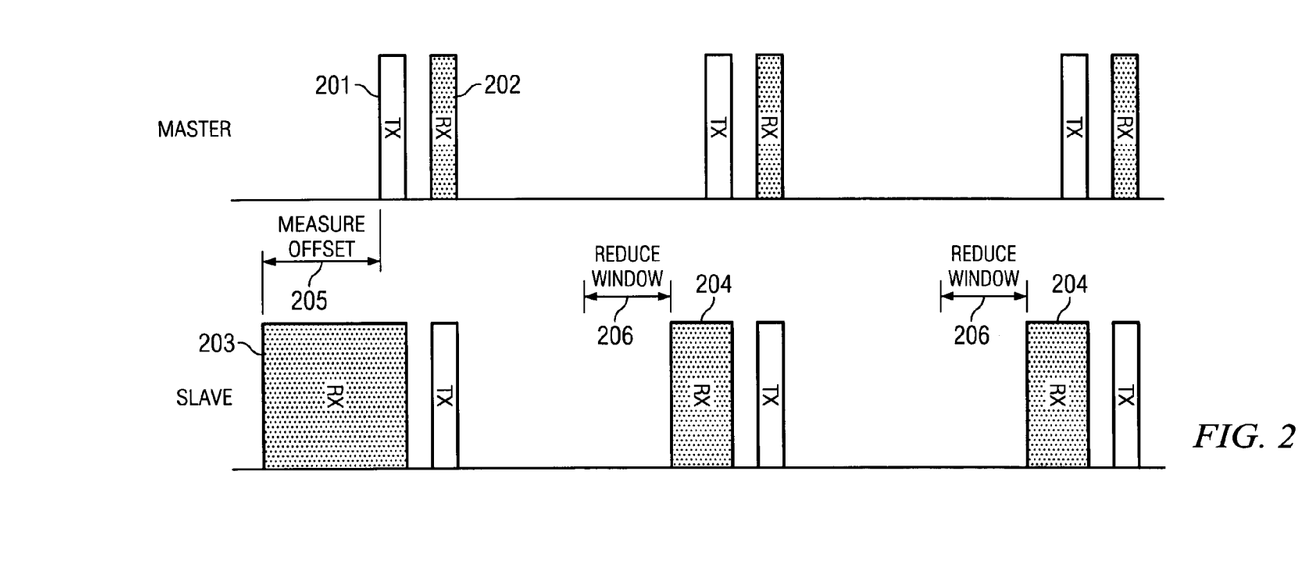
FIG. 2 shows an example embodiment of a timing relationship of a master and a slave receive and transmit slot.

FIG. 2 shows an example embodiment of a timing relationship of a master and a slave receive and transmit slot. Starting on the master line, this example embodiment shows a master sending a message as a short burst (201), for example a request for data, and a master receive slot (202) for a slave's response. The slave opens the receive window (203) well in advance, so that it will not miss the start reception. By doing this, it may increase the probability that if it is within a certain range from the master it will detect the short burst (201) from the master. Hence, the slave first opens a large receive window (203) in order not to miss the master's transmission. Thus, using this approach the slave may have a better chance to connect with the master.

In an example embodiment, the connection interval, for example the interval between two master transmissions in FIG. 2, is known. The slave device may run a sleep clock which runs at all times. Thus, the sleep clock runs when the main clock is stopped, for example when the slave device is asleep. Therefore, the sleep clock may be used to measure the times between two master transmissions. The slave device may derive from the measured time between two master transmissions a calibration value to calibrate its main clock with respect to the master transmissions. The slave device may also use a calibration value derived from the measurement for adjusting the sleep clock relative to the master transmission. The slave device may reduce the receive window (204) by an amount derived from a measured offset (205), resulting in a reduced receive window amount (206). In this way, the slave device can calibrate the sleep clock by measuring the offset (205) between wake up and the time of arrival of the first bit of data. This reduction in the listening window (206) can be applied in subsequent intervals for the duration of that connection.

This is achieved by calibrating/locking the slave's sleep clock to the master device's clock. By performing this calibration/locking of the slave's sleep clock to the master device's clock, several other adjustments may be made to the timing of the receive window for subsequent connection bursts comprising messages that logically continue to flow between the two devices at defined repetition rates. The type of adjustment that can be made may at least partly depend on the expected message format, the expectation that it will have a defined repetition rate, and/or the like.

When the master and slave devices are connected with a known connection interval, the slave device may calibrate the sleep clock by measuring the time between the wake up time and the time of arrival of the first bit of the master transmission. The data from this calibration may be used to provide a time offset to minimize the wake up time in the following connection intervals. The sleep clock calibration may be performed at set intervals, for example to make up for temperature changes that may cause a shift in the frequency of an oscillator in the master or slave device. In an example embodiment, a timer may be set to ensure that the calibration is performed at the set interval.

When a new connection is established this process may be repeated. One or more detected parameter, such as a measurement value of the sleep clock, a calibration value, and/or the like, may be passed to the process described in relation to FIG. 7, and FIG. 12 later in this document.

Figure 3:
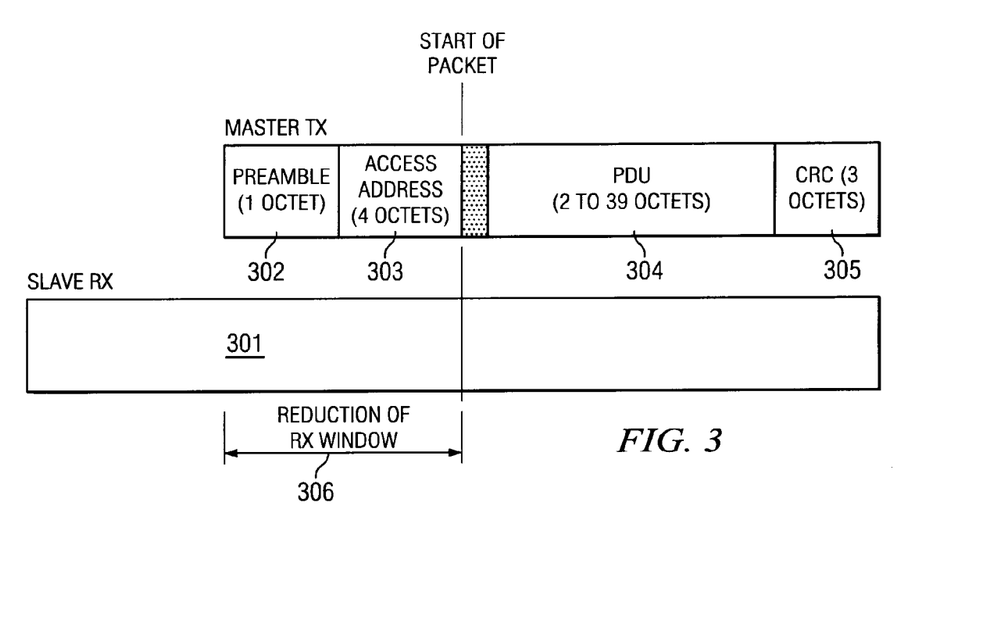
FIG. 3 shows an example embodiment of a timing relationship of a master and a slave when an access address saving can be made.

FIG. 3 shows an example embodiment of a timing relationship of a master and a slave when an access address saving can be made. Starting on the master line, this example embodiment shows the data structure of a data packet when continuing to use a certain unique access address. In this example embodiment, the message data content is made up of the following parts:
Firstly a preamble (302);
Secondly an access address (303);
Then a payload data unit (PDU) which may be 2 to 39 octets (304);
Lastly a CRC (305).

In an example embodiment, the message data content is constructed equally in a number of packets. By the end of the access address field, based on the detection of that access address, the slave receiver may know if the message is one that is destined for it to process and respond to or not. If the message is not destined for the slave receiver, it may close the receive activation window. If the message is destined for the slave receiver, the last part of the access address (303) can be used as the start of the received packet data in place of the start of the preamble (302). In this way, a saving can be made of Rx activation time (306), when a packet destined for the slave receiver is received. One or more detected parameter may be passed to the process described firstly in FIG. 8 and then in FIG. 12 later in this document.

Figure 4:
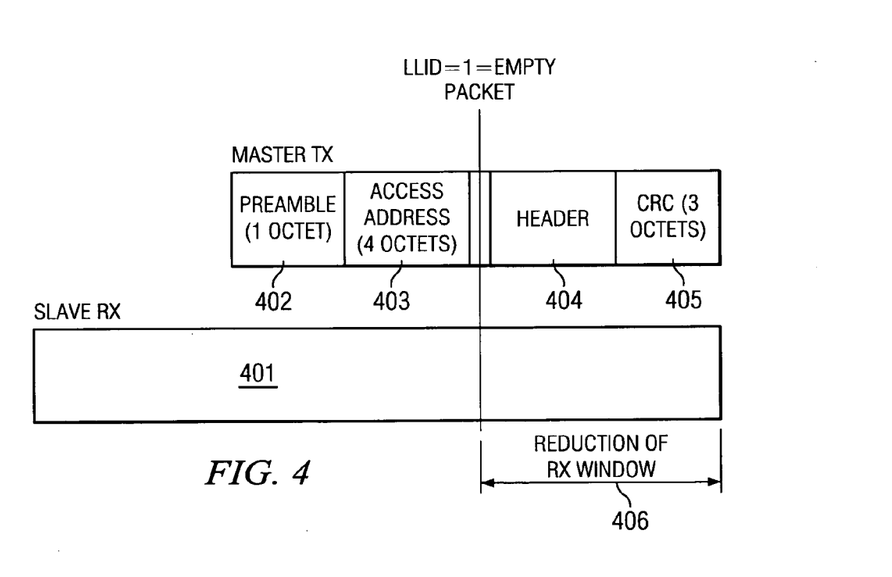
FIG. 4 shows an example embodiment of a timing relationship of a master and a slave for an LLID empty packet.

FIG. 4 shows an example embodiment of a timing relationship of a master and a slave for an LLID empty packet. Starting on the master TX line, this example embodiment shows the condition when the master sends at least one empty packet on every connection. The sent message from the master consists of:

Firstly a preamble (402);
Next the access address (403);
then the header (404);
and finally a CRC (405).

The normal slave receive activation window is shown by (401). Since the LLID field in the message header (404) indicates an empty packet, the slave receive activation window may be truncated at the time (or a short time later) on the detection that the LLID value is set to 1 to indicate ZERO message data content in this example embodiment. The receive activation time saving is indicated in (406) since the rest of the message may be disregarded.

In an example embodiment a similar time saving may be achieved at a master in a transmission from a slave to the master. One or more detected parameter may be passed to the process described firstly in FIG. 9 and then FIG. 12 of this document. This approach may be applied in the master device in the same way for data having empty packets indicated by a value of LLID=1.

Figure 5:
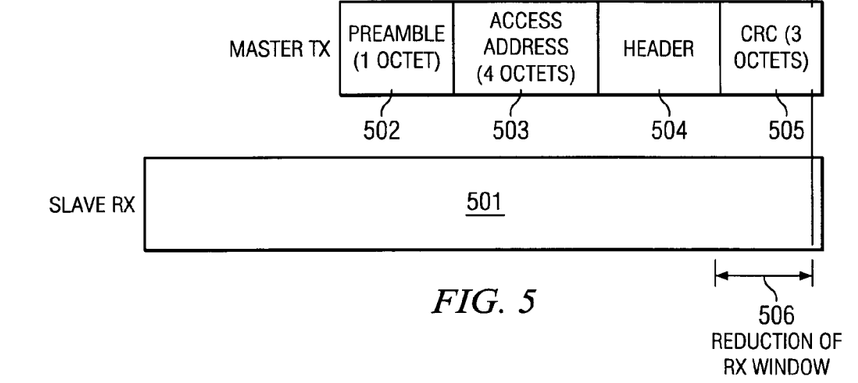
FIG. 5 shows an example embodiment of a timing relationship of a master and a slave when a fixed data length of a data packet is applicable.

FIG. 5 shows an example embodiment of a timing relationship of a master and a slave when a fixed data length of a data packet is applicable. In this example embodiment once more starting on the master TX line, the message structure of the data packet is shown as having:

Firstly, a preamble (502);
Secondly the access address (503);
next the header (504);
and finally the CRC (505).

The normal slave receive activation window is shown as (501). When the master and slave devices are connected and the data length in the message type is fixed, for example when the packet has a fixed format and length, the CRC (505) value may be used as the trigger point to start the slave's receiving mode instead of the start of the preamble (505). In an example embodiment, the master sends an 80 bit fixed message to the slave and the slave sends back as a response another message of 80 bits. The receive activation window is reduced to a short time before the expected CRC would arrive, as shown by (506) and the CRC content is checked. If the CRC is as expected the process may be repeated. In this way because some of the defined messages are just repetitions, for example when the format is constant, the receiver's activation time may be reduced by a modification of the receive activation window timing. If the CRC value is not as expected at any time in the message sequence, then the receive activation window timing may be extended again, for example to the length before a receive activation window timing reduction was executed, like the receive activation window time (501). In this way a time saving may be achieved by not looking at the preamble, access address or header content, but only at the content of the CRC field, so that the receive activation window can be reduced by a duration value as shown in (506). One or more detected parameter may be passed to the process described firstly in FIG. 10 and then finally in FIG. 12 later in this document. A similar or identical approach may be applied in a master device for fixed length packets in the message sequence.

Figure 6:
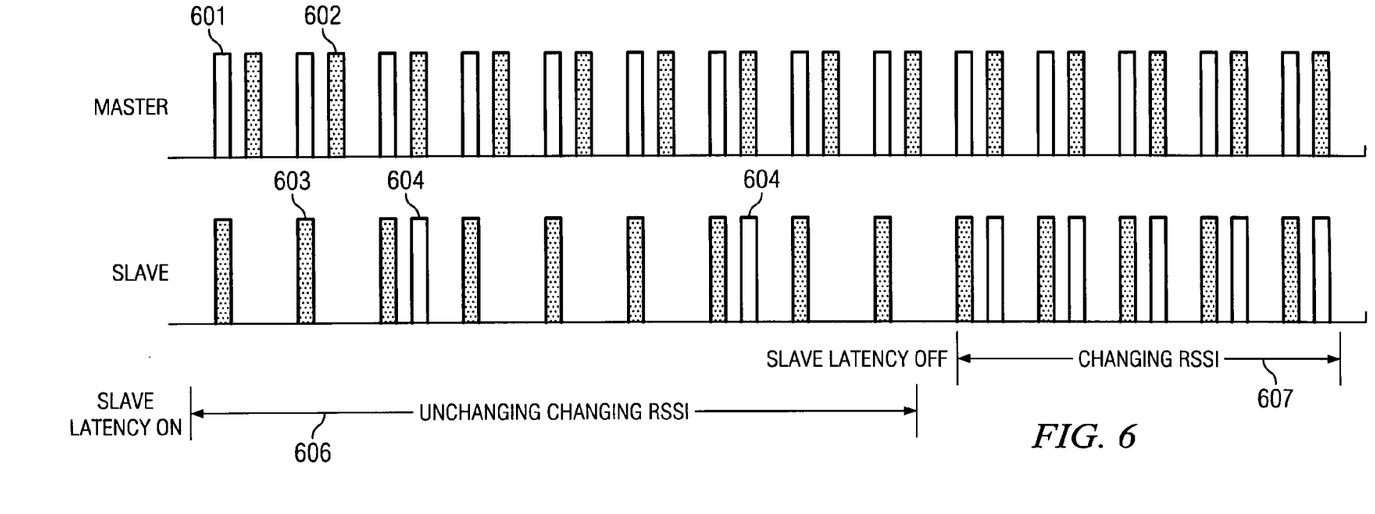
FIG. 6 shows an example embodiment of a timing relationship of a master and a slave when a master sends an empty packet on a connection.

FIG. 6 shows an example embodiment of a timing relationship of a master and a slave when a master sends an empty packet on a connection. In this example embodiment, starting on the master activity line, the repetitive sequence is shown. A master TX burst (601) is followed by a master RX burst (602), for example when the master is listening for the slave's response to its message sent in the master TX burst (601). In an example embodiment, the master and slave devices are connected, and the proximity detection function is enabled at the slave. For example, the slave keeps track of the received signal strength indicator (RSSI) level of the received signal from the master within a preset range. If the RSSI level is constant within the preset range, the slave can assume that the proximity to the master has not changed.

When the slave assumes that the proximity to the master has not changed, the slave may reduce the number of responses it sends to requests from the master, as shown in the slave activity line. Item (603) is a slave RX bursts, and item (604) is a slave response TX burst. When the RSSI level doesn't change, the slave does not respond to all the master's requests, as shown during duration (606). The amount of slave latency applied, such as the number of times the slave responds to the master's requests, can be fixed for example to 1 in 2, 1 in 3, 1 in 4, 1 in 5, or the like, or it may be set dynamically by an application. In the example embodiment shown in FIG. 6, the slave latency is set to 1 in 4. One or more detected parameter may be passed to the process described firstly in FIG. 11 and then finally in FIG. 12 later in this document.

In this example embodiment, the RSSI may change during duration (607) and the slave latency is turned off. Thus, the slave responds to all master packet transmissions, for example transmissions of empty packets.

In yet a further example embodiment, the slave device may skip the receive activity completely, for example if the sleep clock is calibrated within suitable tolerances. In this example embodiment, the receive activation window may be reduced for one or more instances to zero, so that the slave neither listens nor responds at a next interaction.

In yet another example embodiment, one or more of the previously described example embodiments may be combined to control the management of the receive activation window timing.

Figure 7:
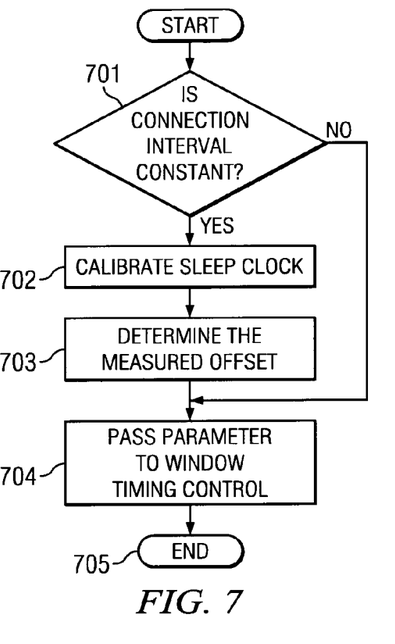
FIG. 7 shows a flow diagram of a constant connection interval process according to an example embodiment of the invention.

FIG. 7 shows a flow diagram of a constant connection interval process according to an example embodiment of the invention. In this example embodiment, a master and a slave device are connected with a known connection interval. The connection interval may be determined from the connection type and message construction. At block (701) it is checked whether the connection interval is constant. If the connection interval is constant, the offset is measured at block (702) as shown in FIG. 2 (205) and described earlier. Then, the calculation of the sleep clock offset is made at block (703). This may be defined as a parameter and passed to the slave receive activation window control process in stage (704). If an error condition is encountered, it may also be passed in the set of parameters to the next process described in FIG. 12 as part of the same or another parameter passing message. If it is determined at block (701) that the connection type does not provide a constant connection interval, the process ends. One or more detected parameters may be defined in stage (704) and are passed to the process described in FIG. 12 later in this document. The process ends at stage (705).

Figure 8:
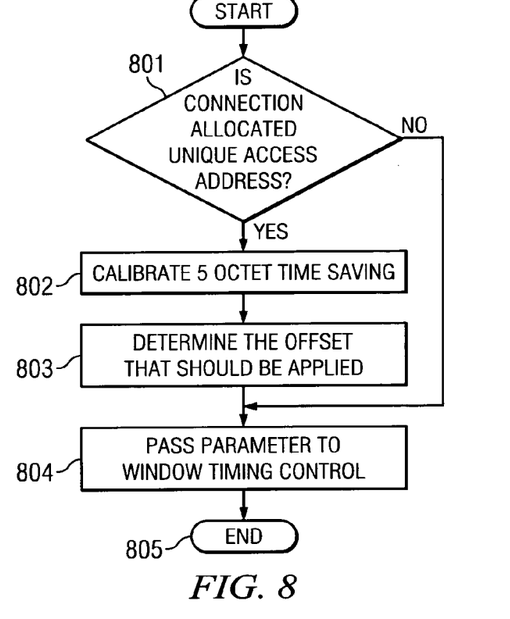
FIG. 8 shows an example embodiment of a process flow diagram for connection access address.

FIG. 8 shows an example embodiment of a process flow diagram for connection access address. In this example embodiment, when the condition of a constant or unique access address is detected by address match process in stage (801) the process is started and moves on to stage (802). In this example embodiment, assuming that the message structure is as shown as in FIG. 3, a time saving value is calculated at block (802). The next process stage (803) converts the time saving value to the receive activation window reduction that can be made. One or more parameters, for example the time saving value, is passed to the slave receive activation window control process at stage (804). A parameter message is created which is then passed to the process of FIG. 12 described later.

If an error condition of any sort is encountered, it may also be passed to the next process as part of the same or a different parameter message. If the connection interval is not constant, or if a unique access address is detected in stage (801), then the process may be ended by changing the values of the parameters that are passed. One or more detected parameters may be passed at stage (804). A parameter message may be created which is then passed to the process of FIG. 12 described later. The process ends at stage (805).

Figure 9:
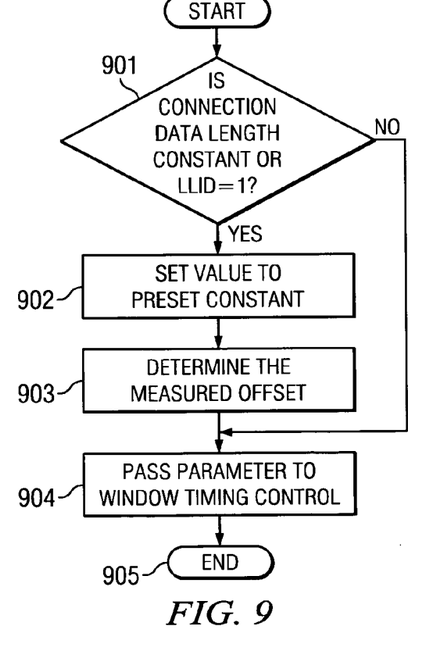
FIG. 9 shows an example embodiment of a process flow diagram for connection with packets having a fixed data length.

FIG. 9 shows an example embodiment of a process flow diagram for connection with packets having a fixed data length. In this example embodiment, a message on a connection may be detected with packets having a fixed data length, for example packets having LLID set to "1", indicating empty packets. Thus, at block (901), the process branches to the "yes" branch and proceeds to stage (902). At stage (902), the time of expected saving is set. At stage (903), a possible receive activation window reduction is calculated, for example receive activation window activation time saving (406) described in relation to FIG. 4. One or more detected parameter may be passed at stage (904) to the process described in FIG. 12 later in this document. If an error condition of any sort is encountered it may also be passed to the next process as part of the same or another message. If at stage (901) the connection type is not one having a constant connection interval, for example a connection with packets having LLID set to "0", one or more detected parameter may be passed at stage (904) to the process described in FIG. 12 later in this document. The process ends at stage (905).

Figure 10:
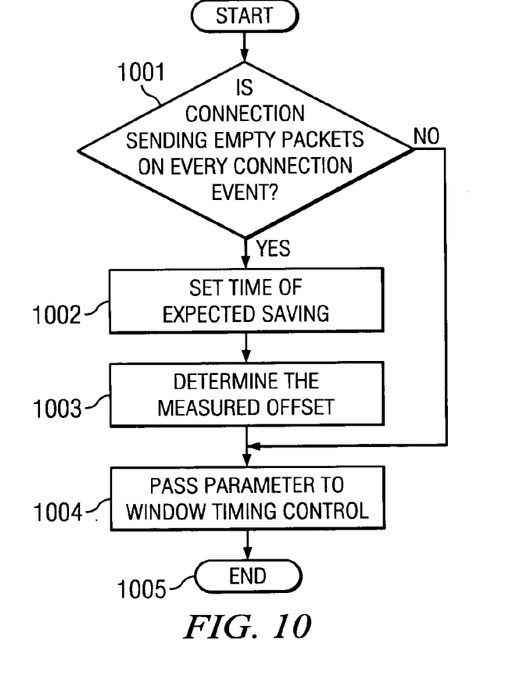
FIG. 10 shows an example embodiment of a process flow diagram for connection when a master sends an empty packet on every connection.

FIG. 10 shows an example embodiment of a process flow diagram for connection when a master sends an empty packet on every connection. In this example embodiment, it is detected whether the length of the messages sent on a connection is constant at block (1001). If the length is detected to be constant, a value is preset to a "constant" setting. At block (1003), a possible receive activation window reduction may be calculated as shown previously in relation to FIG. 5. One or more parameters are passed at block (1004) to the process described in FIG. 12 later in this document. If an error condition of any sort is encountered this may also be passed to the next process as part of the same or another message. If the connection type is not one that may be defined as a connection having a constant connection interval at block (1001), one or more detected parameter may be passed at stage (1004) to the process described in FIG. 12 later in this document. The process ends at stage (1005).

Figures 11, 12:
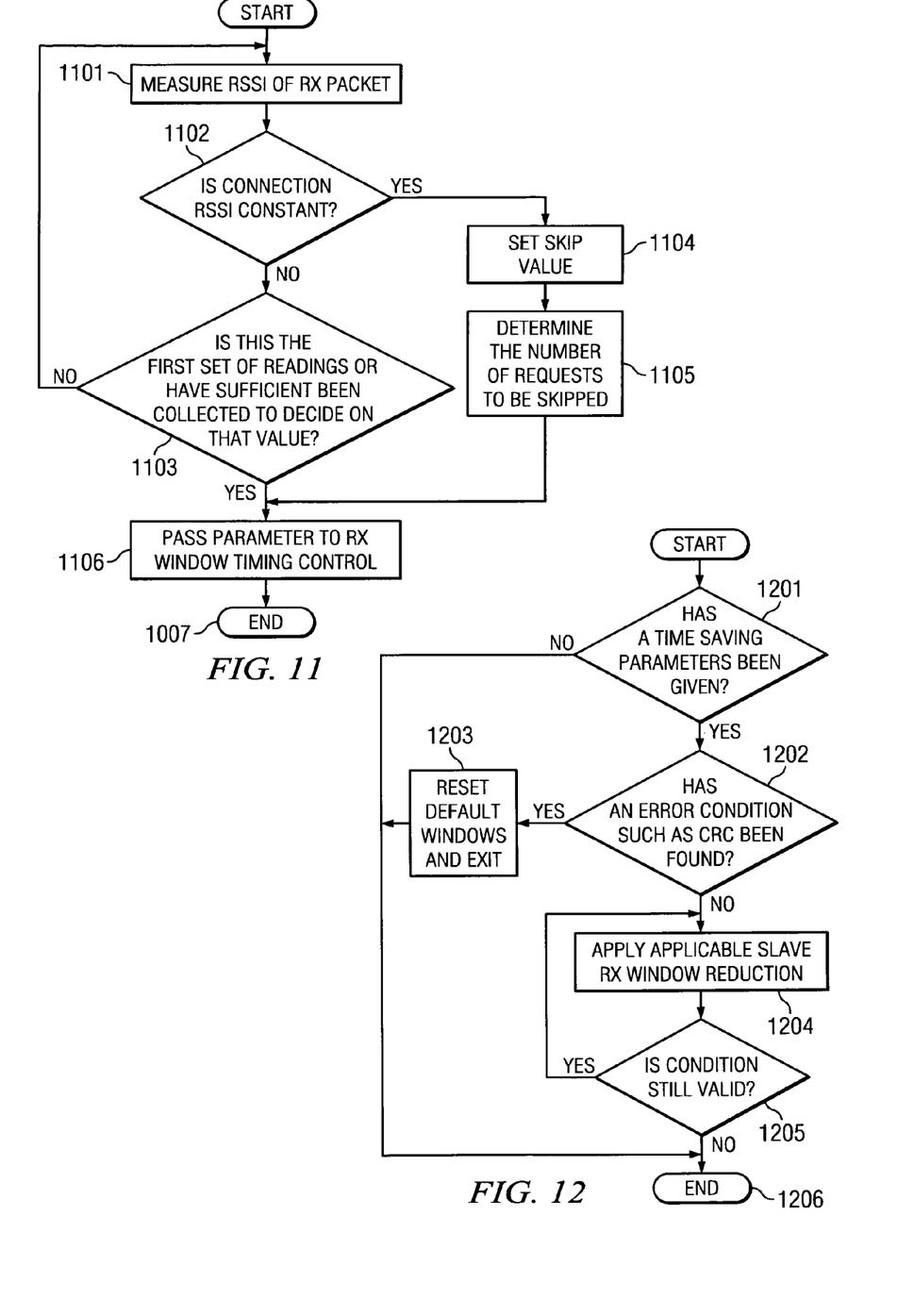
FIG. 11 shows an example embodiment of a connection interval process flow diagram when a connection proximity is determined.
FIG. 12 shows an example embodiment of a process flow diagram for a slave RX window timing control.

FIG. 11 shows an example embodiment of a connection interval process flow diagram when a connection proximity is determined. In this example embodiment an RSSI measurement is performed at stage (1101), for example an RSSI measurement as shown in FIG. 6. A first check at stage (1102) is performed to see if a measured RSSI value is within a defined range. If the measured RSSI value is not within the defined range, a test for sufficient numbers of RSSI measurements in a test set is performed at stage (1103), for example a test whether more than a predefined number of RSSI measurements have been performed within a given time. If not sufficient RSSI measurements have been performed, the process returns to stage (1101) to perform more RSSI measurements. If sufficient RSSI measurements have been performed, one or more detected parameter may be passed at stage (1106) to the process described in FIG. 12 later in this document. The process ends at stage (1107).

When the needed criteria are achieved at stage (1102), for example when it is determined that the measured RSSI value is within the defined range, a skip value is set at stage (1104). The number of communication requests to be skipped are calculated at stage (1105). The number may be used as explained previously in the description of FIG. 6. One or more detected parameters, for example the skip value, the number of requests to be skipped, and/or the like, are passed from at stage (1106) to the process described in FIG. 12 later in this document. If an error condition of any sort is encountered this may also be passed to the next process as part of the same or another message. Again, the process ends at stage (1107).

FIG. 12 shows an example embodiment of a process flow diagram for a slave RX window timing control. This process may be used to set or deselect any or all of the possible time saving options on the receive activation window of the receiver. The first stage (1201) checks whether the passed message has at least one valid parameter. If no parameter is provided the process is ended at stage (1206). If parameters are provided, the process proceeds to stage (1202). At stage (1202), it is checked if an error condition has been identified, for example an error detected by CRC calculation. If an error condition has been identified, the process moves on to stage (1203) which may reset one or more values depending on the error response defined. Following the reset event of stage (1203), the process is once more ended at stage (1206).

When the data passed has not indicated an error condition at block (1202), an receive activation saving is applied at stage (1204). The receive activation saving may depend on the type of condition indicated. Another check is performed at stage (1205). It is checked whether the condition remains valid. If the condition is no longer valid, the process for applying an receive activation saving for the at least one parameter given at stage (1201) ends.

Figure 13:
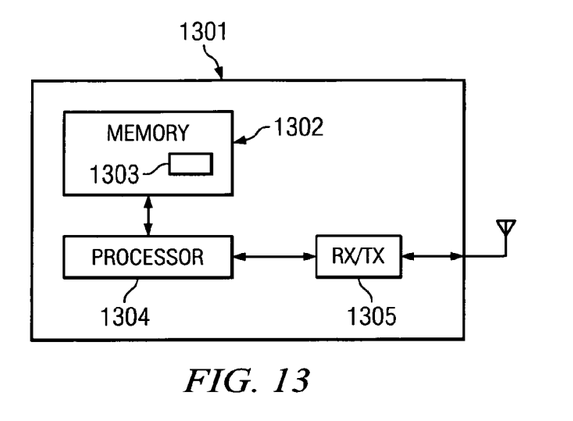
FIG. 13 shows an example embodiment of a Bluetooth slave device.

FIG. 13 shows an example embodiment of a Bluetooth slave device. Bluetooth slave device (1301) may contain the computer code in an executable form (1303) in the memory unit (1302) which may comprise RAM and/or ROM. Memory unit (1302) may be connected to one or more processors (1304) on which the instructions are executed in response to the received messages from a transceiver (1305). Transceiver (1305) may be connected to an antenna for transmitting and receiving packets from another Bluetooth device.

Figure 14:
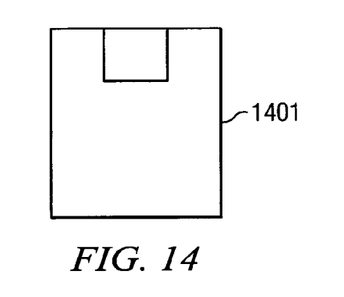
FIG. 14 shows an example embodiment of a tangible memory media.

FIG. 14 shows an example embodiment of a tangible memory media. Media (1401) may be a tangible storage media according to the present invention having program content. Media (1401) may be any form of storage media such as magnetic, solid state, optical media, and/or the like.

Figure 15:
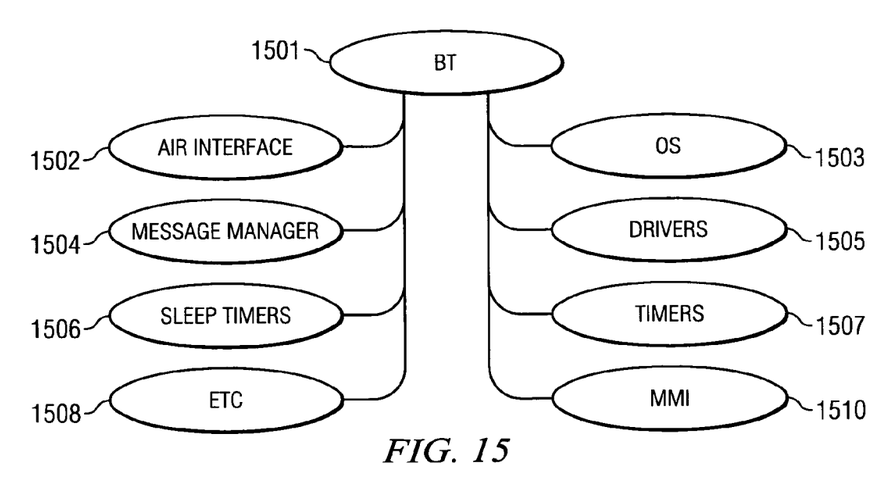
FIG. 15 shows a software (SW) view of an example embodiment of a Bluetooth slave device.

FIG. 15 shows a software (SW) view of an example embodiment of a Bluetooth slave device. This figure shows an example of the main software components that may be implemented on such an apparatus or device.

In this software (SW) view the apparatus has an operating system (OS) (1503) and hardware (HW) drivers (1505). The OS timers used by the OS functions are shown in (1507). The man machine interface (MMI) which may be a single button or several buttons, is shown in (1510).

The interface specific components are a Bluetooth (BT) radio interface protocol control stack (1501), an actual air interface (1502) which is controlled by the drivers (1505) to select RX or TX, and a message manager (1504) which controls the Bluetooth message structures and queues.

Further, the apparatus may comprise at least a sleep timer (1506) that has been described previously in this specification. They may or may not use the OS timers (1507), or may be implemented independently, depending on how the additions described in relation to certain example embodiments of the invention have been implemented in any particular SW structure. The apparatus may comprise other SW components (1508), for example a BT profile manager. The BT profile manager may manage the mode the device is in, define additional messages it may be expected to provide or respond too, and/or the like. In an example embodiment, a device may be simple and have only one profile. In another example embodiment, a device may be more complex and have or support several profiles.

The apparatus may comprise further optional SW components which are not described in this specification since they may not have direct interaction to embodiments of the invention.

Embodiments of the present invention may be implemented in software, hardware, application logic or a combination of software, hardware and application logic. The software, application logic and/or hardware may reside on memory (1302), or any computer media of which an example is shown as (1401). In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 13. A computer-readable medium, as depicted in FIG. 14, may comprise a computer-readable storage medium that may be any media or means that can contain or store the instructions for use by or in connection with an instruction execution system, apparatus, or device, such as a computer as defined previously.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a Bluetooth communication transceiver configured as a Bluetooth low energy device, for receiving communication packets having a packet length and containing digital content information useful for reducing a receive window duration;
a timer configured to perform at least one timing measurement for power saving used for measurement of a connection interval to be used for reducing a size of an activation window; and
a processor configured to adjust a receive timing of the Bluetooth communication transceiver in response to detecting the digital content information in the received communication packets, wherein the processor is configured to detect a logical link identifier field in a header of a received packet by the Bluetooth communication transceiver and adjust an end time of the receive timing of the Bluetooth communication transceiver to reduce the receive duration depending on a content of the logical link identifier field, by turning off the activation window early, in order to reduce the receive window duration, thereby reducing a portion of the packet length received, based at least in part on the at least one timing measurement, the processor configured to continue the reduced receive window duration as long as the received communication packets contain the digital content information.

2. The apparatus of claim 1 wherein the timer is configured to perform the at least one timing measurement for a connection interval of the Bluetooth communication transceiver, and wherein the processor is further configured to adjust a start time of the receive timing of the Bluetooth communication transceiver.

3. The apparatus of claim 2, wherein the processor is configured to use a timing of a unique access address for the Bluetooth communication transceiver as the start time of the receive timing of the Bluetooth communication transceiver.

4. The apparatus of claim 1 wherein the processor is configured to determine whether a distance to a communicating device is within a predetermined range, and wherein the processor is further configured to adjust the receive timing of the Bluetooth communication transceiver by reducing the number of responses sent by the Bluetooth communications transceiver during a given time period.

5. A method, comprising:
receiving, at a Bluetooth communication transceiver configured as a Bluetooth low energy device, communication packets having a packet length and containing digital content information useful for reducing a receive window duration;
performing, at the Bluetooth communication transceiver configured as a Bluetooth low energy device, at least one timing measurement for power saving used for measurement of a connection interval to be used for reducing a size of an activation window;
adjusting a receive timing of the Bluetooth communication transceiver to reduce the receive window duration in response to detecting the digital content information in the received communication packets, to detect a logical link identifier field in a header of a received packet by the Bluetooth communication transceiver and adjust an end time of the receive timing of the Bluetooth communication transceiver to reduce the receive window duration depending on a content of the logical link identifier field, by turning off the activation window early, thereby reducing a portion of the packet length received, based at least in part on the at least one timing measurement; and
continuing the reduced receive window duration as long as the received communication packets contain the digital content information.

6. The method according to claim 5 wherein the at least one timing measurement is a measurement of a connection interval, further comprising adjusting a start time of the receive timing for at least one subsequent interval.

7. The method according to claim 6 wherein a timing of a unique access address is used as the start time of the receive timing of the Bluetooth communication transceiver.

8. A Bluetooth low energy apparatus, comprising:
   a communication transceiver configured for receiving communication packets containing digital content information useful for reducing a receive duration;
   a processor;
   a memory including computer program code;
   the memory and the computer program code configured to, with the processor, cause the apparatus at least to
   decide on when to receive subsequent transmissions when multiple time savings can be made;
   apply a method described in claim 5 to or 7 based on at least two measured timings of received transmissions of communication packets having a packet length; and
   adjust a receive window duration of receive activation based at least in part on the at least two of the measured timings to reduce the receive window duration and the digital content information in the received communication packets useful for reducing the receive window duration, thereby reducing a portion of the packet length received.

9. An apparatus, comprising:
   at least one processor; and
   at least one memory including computer program code, the at least one memory and the computer program code configured to, with the at least one processor, cause the apparatus to perform at least the following:
   perform, at a Bluetooth communication transceiver configured as a Bluetooth low energy device, at least one timing measurement for power saving used for measurement of a connection interval to be used for reducing a size of an activation window;
   receive communication packets having a packet length and containing digital content information useful for reducing a receive window duration;
   adjust a receive timing of the Bluetooth communication transceiver to reduce the receive window duration in response to detecting the digital content information in the received communication packets, to detect a logical link identifier field in a header of a received packet by the Bluetooth communication transceiver and adjust an end time of the receive timing of the Bluetooth communication transceiver to reduce the receive window duration depending on a content of the logical link identifier field, by turning off the activation window early, thereby reducing a portion of the packet length received, based at least in part on the at least one timing measurement; and
   continue the reduced receive window duration as long as the received communication packets contain the digital content information.

10. A computer program product comprising a non-transitory computer-readable medium bearing computer program code embodied therein for use with a computer, the computer program code comprising:
    code for performing, at a Bluetooth communication transceiver configured as a Bluetooth low energy device, at least one timing measurement for power saving used for measurement of a connection interval to be used for reducing a size of an activation window;
    code for receiving communication packets having a packet length and containing digital content information useful for reducing a receive window duration;
    code for adjusting a receive timing of the Bluetooth communication transceiver to reduce the receive window duration in response to detecting the digital content information in the received communication packets, to detect a logical link identifier field in a header of a received packet by the Bluetooth communication transceiver and adjust an end time of the receive timing of the Bluetooth communication transceiver to reduce the receive window duration depending on a content of the logical link identifier field, by turning off the activation window early, thereby reducing a portion of the packet length received, based at least in part on the at least one timing measurement; and
    code for continuing the reduced receive window duration as long as the received communication packets contain the digital content information.

11. A non-transitory computer-readable medium encoded with instructions that, when executed by a processor, perform:
    measuring, at a Bluetooth communication transceiver configured as a Bluetooth low energy device, at least one timing measurement for power saving used for measurement of a connection interval to be used for reducing a size of an activation window;
    receiving communication packets having a packet length and containing digital content information useful for reducing a receive window duration;
    adjusting a receive timing of the Bluetooth communication transceiver to reduce the receive window duration in response to detecting the digital content information in the received communication packets, to detect a logical link identifier field in a header of a received packet by the Bluetooth communication transceiver and adjust an end time of the receive timing of the Bluetooth communication transceiver to reduce the receive window duration depending on a content of the logical link identifier field, by turning off the activation window early, thereby reducing a portion of the packet length received, based at least in part on the at least one timing measurement; and
    code for continuing the reduced receive window duration as long as the received communication packets contain the digital content information.

12. An apparatus, comprising:
    a Bluetooth communication transceiver configured as a Bluetooth low energy device, for receiving communication packets having a packet length and containing digital content information useful for reducing a receive window duration;
    a timer configured to perform at least one timing measurement for power saving used for measurement of a connection interval to be used for reducing a size of an activation window; and
    a processor configured to adjust a receive timing of the Bluetooth communication transceiver in response to detecting the digital content information in the received communication packets, wherein the processor is configured to detect if a connection is of a fixed data length such that a cyclic redundancy check value is known, and wherein the processor is further configured to shift a start time of the receive activation window timing of the Bluetooth communication transceiver to a timing just before reception of the expected cyclic redundancy check value in order to reduce the receive window duration, thereby reducing a portion of the packet length received, based at least in part on the at least one timing measurement, the processor configured to continue the reduced receive window duration as long as the received communication packets contain the digital content information.

13. A method, comprising:
    receiving, at a Bluetooth communication transceiver configured as a Bluetooth low energy device, communication packets having a packet length and containing digital content information useful for reducing a receive window duration;

performing, at the Bluetooth communication transceiver configured as a Bluetooth low energy device, at least one timing measurement for power saving used for measurement of a connection interval to be used for reducing a size of an activation window;

adjusting a receive timing of the Bluetooth communication transceiver to reduce the receive window duration in response to detecting the digital content information in the received communication packets, to detect if a connection is of a fixed data length such that a cyclic redundancy check value is known, and to shift a start time of the receive activation window timing of the Bluetooth communication transceiver to a timing just before reception of the expected cyclic redundancy check value to reduce the receive window duration, thereby reducing a portion of the packet length received, based at least in part on the at least one timing measurement; and continuing the reduced receive window duration as long as the received communication packets contain the digital content information.

14. A computer program product comprising a non-transitory computer-readable medium bearing computer program code embodied therein for use with a computer, the computer program code comprising:

code for receiving, at a Bluetooth communication transceiver configured as a Bluetooth low energy device, communication packets having a packet length and containing digital content information useful for reducing a receive window duration;

code for performing, at the Bluetooth communication transceiver configured as a Bluetooth low energy device, at least one timing measurement for power saving used for measurement of a connection interval to be used for reducing a size of an activation window;

code for adjusting a receive timing of the Bluetooth communication transceiver to reduce the receive window duration in response to detecting the digital content information in the received communication packets, to detect if a connection is of a fixed data length such that a cyclic redundancy check value is known, and to shift a start time of the receive activation window timing of the Bluetooth communication transceiver to a timing just before reception of the expected cyclic redundancy check value to reduce the receive window duration, thereby reducing a portion of the packet length received, based at least in part on the at least one timing measurement; and code for continuing the reduced receive window duration as long as the received communication packets contain the digital content information.

* * * * *